United States Patent
Wallach et al.

(10) Patent No.: US 12,193,378 B1
(45) Date of Patent: Jan. 14, 2025

(54) AUTOMATIC CONTROL OF AN ENCLOSED CROP GROWING DEVICE

(71) Applicant: Agwa Farm Ltd., Bar-Lev (IL)

(72) Inventors: Alon Wallach, Haifa (IL); Niv Stolarski, Kamon (IL)

(73) Assignee: Agwa Farm Ltd., Bar-Lev (IL)

( * ) Notice: Subject to any disclaimer, the term of this patent is extended or adjusted under 35 U.S.C. 154(b) by 0 days.

(21) Appl. No.: 18/591,087

(22) Filed: Feb. 29, 2024

(51) Int. Cl.
*A01G 9/26* (2006.01)
*G06V 10/774* (2022.01)
*G06V 20/10* (2022.01)
*G06V 20/70* (2022.01)

(52) U.S. Cl.
CPC .............. *A01G 9/26* (2013.01); *G06V 10/774* (2022.01); *G06V 20/188* (2022.01); *G06V 20/70* (2022.01)

(58) Field of Classification Search
CPC ....... A01G 9/26; G06V 10/774; G06V 20/188
See application file for complete search history.

(56) References Cited

U.S. PATENT DOCUMENTS

2020/0344965 A1* 11/2020 Song ................. H05B 47/16
2021/0027057 A1*  1/2021 Genty ................ G06V 20/10

* cited by examiner

*Primary Examiner* — Vu Le
*Assistant Examiner* — Tracy Mangialaschi

(57) ABSTRACT

A computer implemented method of automatically controlling an enclosed crop growing device, comprising: feeding an image of the enclosed crop growing device into a machine learning model, wherein the image simultaneously depicts a plurality of crops of a plurality of different types at a plurality of different growth stages arranged at a plurality of predefined crop growing locations within the enclosed crop growing device, obtaining as an outcome of the ML model, a plurality of parameters for setting a plurality of environmental control components that control an environment of the enclosed crop growing device, and automatically adjusting the plurality of environmental control components according to the plurality of parameters.

28 Claims, 8 Drawing Sheets

702

704

802

804

806

808

AUTOMATIC CONTROL OF AN ENCLOSED CROP GROWING DEVICE

BACKGROUND

The present invention, in some embodiments thereof, relates to machine learning models and, more specifically, but not exclusively, to systems and methods for automatic control for growing crops using machine learning models.

Traditional machine learning models for growing crops in agricultural fields encompass a variety of techniques and applications aimed at optimizing agricultural practices, enhancing crop yield, and minimizing resource use. These models leverage data from various sources such as satellite imagery, weather forecasts, soil conditions, and historical farming data to make predictions and recommendations for farmers.

SUMMARY

According to a first aspect, a computer implemented method of automatically controlling an enclosed crop growing device, comprises: feeding an image of the enclosed crop growing device into a machine learning model, wherein the image simultaneously depicts a plurality of crops of a plurality of different types at a plurality of different growth stages arranged at a plurality of predefined crop growing locations within the enclosed crop growing device, obtaining as an outcome of the ML model, a plurality of parameters for setting a plurality of environmental control components that control an environment of the enclosed crop growing device, and automatically adjusting the plurality of environmental control components according to the plurality of parameters.

In a further implementation form of the first aspect, further comprising training the machine learning model by: creating a training dataset of a plurality of records, wherein a record includes: a sample image of a sample enclosed crop growing device, wherein the sample image simultaneously depicts a plurality of crops of a plurality of different types at a plurality of different growth stages arranged at a plurality of predefined crop growing locations of the sample enclosed crop growing device, a plurality of annotations of the sample image, each crop associated with at least one annotation including at least one of: type of crop, growth stage, and for each crop location an indication of whether a crop is present in the crop growing location or whether the crop growing location is empty, and a ground truth of a plurality of parameters for setting a plurality of environmental control components that control an environment of the sample enclosed crop growing device where the plurality of crops depicted in the sample image are growing, and training the machine learning model on the training dataset.

In a further implementation form of the first aspect, a record further includes an indication of crop status including yield and/or quality, and wherein the ML model is trained for selecting the parameters for optimizing and/or maximizing the yield and/or quality of the plurality of crops.

In a further implementation form of the first aspect, further comprising extracting a plurality of features of the image, and feeding the plurality of features into the ML model.

In a further implementation form of the first aspect, extracting the plurality of features comprises generating a bounding box corresponding to each predefined crop growing location and/or each crop of the plurality of crops, and annotating each bounding box with at least one annotation, wherein feeding comprises feeding the image with a plurality of bounding boxes corresponding to the plurality of different crops, each bounding box associated with at least one annotation.

In a further implementation form of the first aspect, the annotation of each box includes at least one of: the type of crop, growth stage of the crop, and whether a crop is present at the crop growing location denoted by the bounding box or whether the crop growing location is empty.

In a further implementation form of the first aspect, the growth stage is selected from: pod stage prior to emergence of leaves, new plant, end of life plant requiring replacement, plant ready to harvest, plant not yet ready to harvest.

In a further implementation form of the first aspect, the annotating is automatically performed by: feeding the image into a detector model that generates a plurality of bounding boxes, cropping each bounding box, and feeding each bounding box into a classifier that generates at least one annotation as an outcome thereof.

In a further implementation form of the first aspect, the detector model is trained on a training dataset of a plurality of records, each record including a sample image of a sample enclosed crop growing device depicting a plurality of crops of a plurality of different types at a plurality of different growth stages arranged at a plurality of predefined crop growing locations of the sample enclosed crop growing device, and a ground truth of a plurality of bounding boxes, each bounding box demarcating a single crop or a single empty crop growing location.

In a further implementation form of the first aspect, for each bounding box the ground truth further includes a growth stage, and/or whether the bounding box denotes the single crop or the single empty cropping location.

In a further implementation form of the first aspect, the classifier comprises a multi-class classifier, the multi-class classifier is trained on a training dataset of a plurality of records, wherein a record includes a sample cropped bounding box extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating a type of crop from the plurality of different types.

In a further implementation form of the first aspect, the annotation comprises an indication of whether insects are present in the bounding box or not.

In a further implementation form of the first aspect, the classifier is trained on a training dataset of a plurality of records, wherein a record includes a sample bounding box depicting a single crop extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating whether one or more insects are present on the crop or not.

In a further implementation form of the first aspect, the annotation comprises an indication of health of each crop depicted in each bounding box, the health of the crop including an indication of at least one of nutrition and disease.

In a further implementation form of the first aspect, the classifier is trained on a training dataset of a plurality of records, wherein a record includes a sample bounding box depicting a single crop extracted from a sample image depicting a plurality of crops of a plurality of different types at a plurality of different growth stages arranged at a plurality of predefined crop growing locations, and a ground truth indicating health of the crop.

In a further implementation form of the first aspect, the annotation comprises an indication of whether the crop depicted in the bounding box is ready for harvesting or not.

In a further implementation form of the first aspect, further comprising generating an alert in response to the indication of ready for harvesting.

In a further implementation form of the first aspect, the classifier comprises a binary classifier trained on a training dataset of a plurality of records, wherein a record includes a sample bounding box depicting a single crop extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating whether the single crop is ready for harvesting or not.

In a further implementation form of the first aspect, at least one feature of the plurality of features indicate a geographical arrangement of each predefined crop growing location of the plurality of predefined crop growing locations, and/or distances between the crop growing locations.

In a further implementation form of the first aspect, the at least one feature includes at least one of a grid and a graph indicating relative locations of the plurality of crops and/or distances between the plurality of crops.

In a further implementation form of the first aspect, further comprising feeding at least one of current values of the plurality of parameters and historical values of the plurality of parameters into the ML model in combination with the image.

In a further implementation form of the first aspect, at least one of the predefined crop growing locations depicted in the image is empty.

In a further implementation form of the first aspect, the plurality of parameters include: illumination pattern for generation by an artificial light source, temperature pattern by an air conditioner component, and irrigation pattern by an irrigation component.

In a further implementation form of the first aspect, the plurality of parameters generated by the ML model are predicted to obtain an optimal crop output for a combination of the plurality of crops.

In a further implementation form of the first aspect, further comprising feeding into the ML model in combination with the image, an indication of a pattern of historical harvesting events of at least one crop labelled with at least one timestamp, and wherein the plurality of parameters are according to a prediction of a pattern of future harvesting of at least one crop, for increasing or slowing a rate of growth of the at least one crop to be ready for harvesting according to the predicted pattern.

In a further implementation form of the first aspect, the ML model further generates a recommendation for presentation on a display of a client terminal, the recommendation for a pattern of placement of at least one new crop in the enclosed crop growing device.

In a further implementation form of the first aspect, further comprising feeding into the ML model in combination with the image, features extracted from one or more sensors monitoring the enclosed crop growing device.

In a further implementation form of the first aspect, the plurality of parameters are for setting each one of the environmental control components at customized values, wherein the environmental control components are distributed and located at different locations within the enclosed crop growing device according to a distribution pattern, the plurality of parameters are for the distribution pattern.

In a further implementation form of the first aspect, further comprising analyzing the image to identify at least one crop as a weakest of the plurality of crops, feeding the indication of the weakest at least one crop into the ML model in combination with the image, wherein the parameters are for setting the plurality of environmental control parameters for improving growth of the at least one weakest of the plurality of crops, and iterating the analyzing the image to identify a new at least one crop as the weakest, and the feeding for obtaining a new set of parameters for improving growth of the new at least one weakest crop.

According to a second aspect, a computer implemented method of training a machine learning model for automatically controlling an enclosed crop growing device, comprises: creating a training dataset of a plurality of records, wherein a record includes: a sample image of a sample enclosed crop growing device, wherein the sample image simultaneously depicts a plurality of crops of a plurality of different types at a plurality of different growth stages arranged at a plurality of predefined crop growing locations of the sample enclosed crop growing device, a plurality of annotations of the sample image, each crop associated with at least one annotation including at least one of: type of crop, growth stage, and for each crop location an indication of whether a crop is present in the crop growing location or whether the crop growing location is empty, and a ground truth of a plurality of parameters for setting a plurality of environmental control components that control an environment of the sample enclosed crop growing device where the plurality of crops depicted in the sample image are growing, and training a machine learning model on the training dataset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

Figure 1:
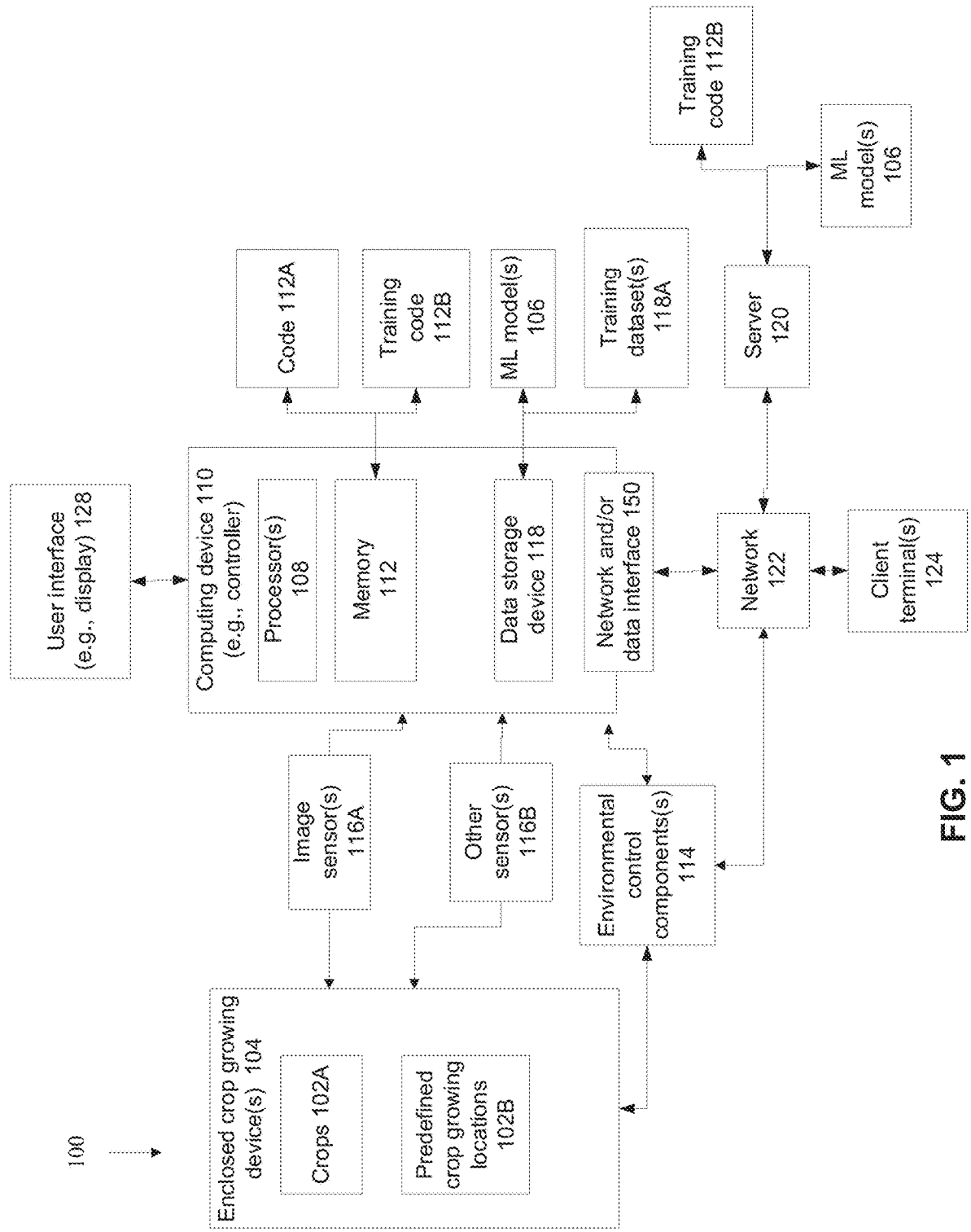
FIG. 1 is a block diagram of components of a system including a computing device for running a ML model for controlling parameter(s) of environmental control components of an enclosed crop growing device housing crops of multiple different types and/or at different growth stages in multiple predefined crop growing locations, in accordance with some embodiments of the present invention.

The present invention, in some embodiments thereof, relates to a machine learning models and, more specifically, but not exclusively, to systems and methods for automatic control for growing crops using machine learning models.

An aspect of some embodiments of the present invention relates to systems, method, devices, and/or code instructions (e.g., stored on a data storage device and executable by one or more processors) for automatically controlling an enclosed crop growing device. The enclosed crop growing device may be an enclosure with multiple predefined crop growing location, for example, apertures and/or small containers sized and/or shaped for fitting of pods of earth with seeds and/or seedlings therein. There may be multiple different types of plants at various growth stages simultaneously located in the different crop growing locations within the same enclosed crop growing device. An image of the enclosed crop growing device is captured, optionally by a camera set to capture all of the different crop growing location simultaneously, in the same image. The image simultaneously depicts multiple crops of different types multiple different growth stages arranged at multiple different predefined crop growing locations within the enclosed crop growing device. One or more of the crop growing locations may be empty. The image may be processed, by extraction of features therefrom. The features may be extracted by feeding the image into one or more detectors ML models that generate outcomes of multiple bounding boxes (or other boundary shapes). Each bounding box may represent one of the crops within a corresponding crop growing locations. Each bounding box may be annotated with one or more annotations, for example, the type of crop, growth stage of the crop, and whether a crop is present at the crop growing location denoted by the bounding box or whether the crop growing location is empty, indication of health of the crop, whether the crop depicted in the bounding box is ready for harvesting or not, and the like. Optionally, another feature(s) is computed, including a geographical arrangement of the predefined crop growing locations, and/or distances between the crop growing locations, for example a graph and/or grid indicating the relative locations and/or relative distances. Other features may be computed and/or obtained, for example, a history of agricultural practices applied by a user. The image and/or boundary boxes with annotations and/or geographical arrangement and/or other features (e.g., sensor data, agricultural practices) are fed into a machine learning model. Parameters for setting multiple environmental control components that control an environment of the enclosed crop growing device are obtained as an outcome of the machine learning model. The parameters may be determined by the ML model as predicted to obtain optimal crop quality and/or yield. The environmental control components are automatically adjusted according to the parameters.

At least some embodiments described herein address the technical problem of optimizing quality and/or yield of crops growing in an enclosed crop growing device, where different types of crops at different growth stages are simultaneously growing in the same enclosed crop growing device, under common environmental control components (e.g., irrigation, feeding, light, temperature, humidity). At least some embodiments described herein improve the technology of automated systems for crop growing, and/or improve the technology of machine learning models, by providing a machine learning model for automatically controlling environmental control components of an enclosed crop growing device, where different types of crops at different growth stages are simultaneously growing. At least some embodiments described herein improve upon prior approaches of growing crops in an enclosed crop growing device. In prior approaches, crops all of a same type and of a same growth stage. For example, seeds of a same type of crop are all planted at the same time. The uniformity of the type of crop and the growth stage simplify decision making for control of environmental conditions within the enclosed crop growing device. Moreover, in prior approaches, control of the environment of the enclosed crop growing device is done manually by a user, for example, a user visually observing the state of the crops, the wetness of the soil, and looking at a thermometer and/or humidity sensor, and then manually changing the environmental conditions.

At least some embodiments described herein address the aforementioned technical problem, and/or improve the aforementioned technical field, and/or improve upon the aforementioned prior approaches, by feeding an image and/or other features into a machine learning model. The image simultaneously depicts multiple different crops of different types, at different growth stages, and at different predefined crop growing locations within the enclosed crop growing device. The image may be analyzed for extracting features therefore, optionally by feeding the image into one or more detectors ML models that generate outcomes of multiple bounding boxes (or other boundary shapes). Each bounding box may represent one of the crops within a corresponding crop growing locations. Each bounding box may be annotated with one or more annotations, for example, the type of crop, growth stage of the crop, and whether a crop is present at the crop growing location denoted by the bounding box or whether the crop growing location is empty, indication of health of the crop, whether the crop depicted in the bounding box is ready for harvesting or not, and the like. Optionally, another feature(s) is computed, including a geographical arrangement of the predefined crop growing locations, and/or distances between the crop growing locations, for example a graph and/or grid indicating the relative locations and/or relative distances. The image and/or boundary boxes with annotations and/or geographical arrangement and/or other features are fed into a machine learning model. Parameters for setting multiple environmental control components that control an environment of the enclosed crop growing device are obtained as an outcome of the machine learning model. The parameters may be determined by the ML model as predicted to obtain optimal crop quality and/or yield. The environmental control components are automatically adjusted according to the parameters. The automatic adjustment may be based on a prediction of optimizing crop quality and/or yield for the combination of crops of different types and/or different growth stages and/or at different physical location within the enclosed crop growing device.

At least some embodiments described herein improve a user experience of a user using an enclosed crop growing device for growing crops, for example, for growing fresh vegetables and/or herbs such as lettuce, parsley, and dill, at home for immediate cooking and/or consumption. At least some embodiments described herein provide a user with the freedom to grow any combination of crops they like, without being limited to the growth stage of the crop. For example, the user may obtain different types of crops at their own pace, placing new pods with seeds within the enclosed crop growing device at different points in time. At least some embodiments described herein use the ML model to optimize the environmental conditions of the combination of different types of crops at different growth stages predicted to maximize crop quality and/or yield. This is in contrast to requiring the user to grow a homogenous type of crop, where all the crops are at the same growth stage, for example, planting only parsley seeds at the same time.

At least some embodiments described herein address the technical problem of generating a continuous (e.g., stepwise) supply of crop for harvesting. For example, every Friday morning a lettuce and parsley are to be ready for harvesting. At least some embodiments described herein improve the technology of automated control of environmental control components, by setting parameters for operating the environmental control components to obtain the continuous supply of crop for harvesting. At least some embodiments described herein improve over standard approaches of harvesting crops, where a single crop is sowed at the same time, and harvested at the same time. At least some embodiments described herein address the aforementioned technical problem, and/or improve the aforementioned technical field, by predicting of a pattern of future harvesting for one or more crops which may be of different types and are at different growth stages. For example, based on historical user harvesting of a lettuce and parsley every Friday morning, the ML model may predict the future harvesting pattern will continue, where a lettuce and parsley are harvested every Friday morning. Since there is a harvest every Friday, plants which are still growing are to be present in the enclosed crop growing container to enable the weekly harvest. The pattern may define the stages of growth of multiple crops simultaneously located in the enclosed crop growing device, such that every Friday one lettuce and one parsley are ready for harvesting, somewhat like a continuously supply production line. The parameters may be for setting the environmental control components according to the predicted pattern, for example, that every Friday morning one lettuce and one parsley are ready for harvesting. The parameters may be for increasing or slowing a rate of growth of the crop(s) to be ready for harvesting according to the predicted pattern. The parameters may take into account the multiple different crop at different stages of growth to obtain the weekly supply of lettuce and parsley.

At least some embodiments described herein address the technical problem of optimizing growth of multiple crops and/or at different stages of growth, which are growing at a high density and/or close together in a relatively small space within an enclosed crop growing device, and which may all be under the same environmental conditions. Obtaining high yield and/or high quality of crops in such close conditions is difficult. At least some embodiments described herein improve the technology of enclosed crop growing devices, by enabling high yield and/or high quality of crops growing close together in a small space. At least some embodiments described herein improve upon standard approaches, where for example, all crops are of a same type and/or at a same growth stage, growing at a high density (e.g., close together). At least some embodiments described herein address the aforementioned technical problem, and/or improve the aforementioned technical field, by analyzing the image to identify one (or more) crops as a weakest of the crops currently growing in the enclosed crop growing device. The indication of the weakest crop may be fed into the ML model in combination with the image. The parameters obtained from the ML model are for setting the environmental control parameters for improving growth of the weakest of the crops. The analysis of the image to identify a new crop as the weakest, and the feeding into the ML model for obtaining a new set of parameters for improving growth of the new at least one weakest crop, may be iterated over multiple time intervals, where each time a different crop may be identified as weakest. Inventors discovered that iteratively setting (e.g., optimizing) the parameters obtained from the ML model are for setting the environmental control parameters for improving growth of the weakest current crop provides an overall optimal yield and/or quality of all the crops growing in high density within the enclosed crop growing device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
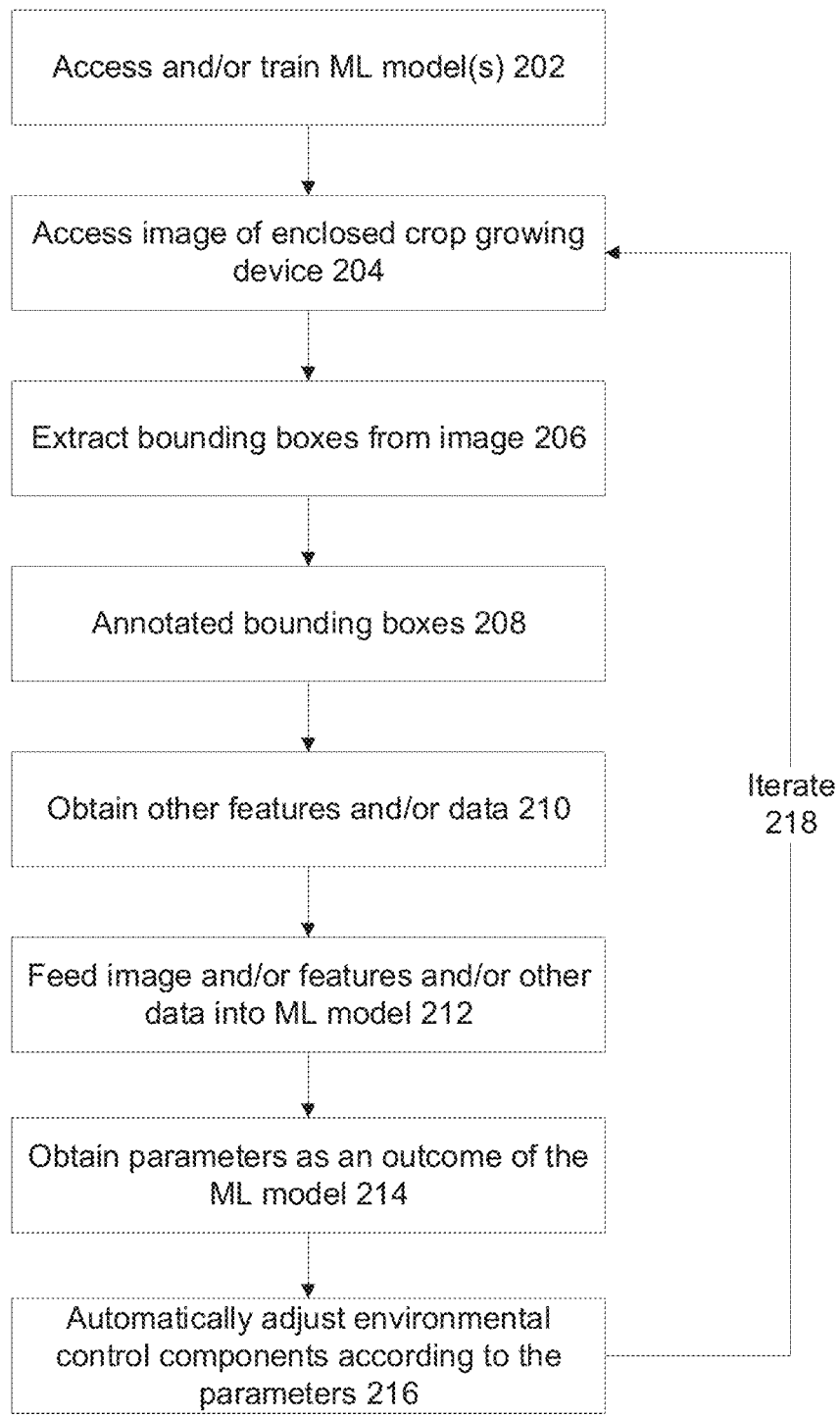
FIG. 2 is a flowchart of a method of automatically controlling an enclosed crop growing device housing different types of crops and/or at different growth stages, in accordance with some embodiments of the present invention.
Figure 3:
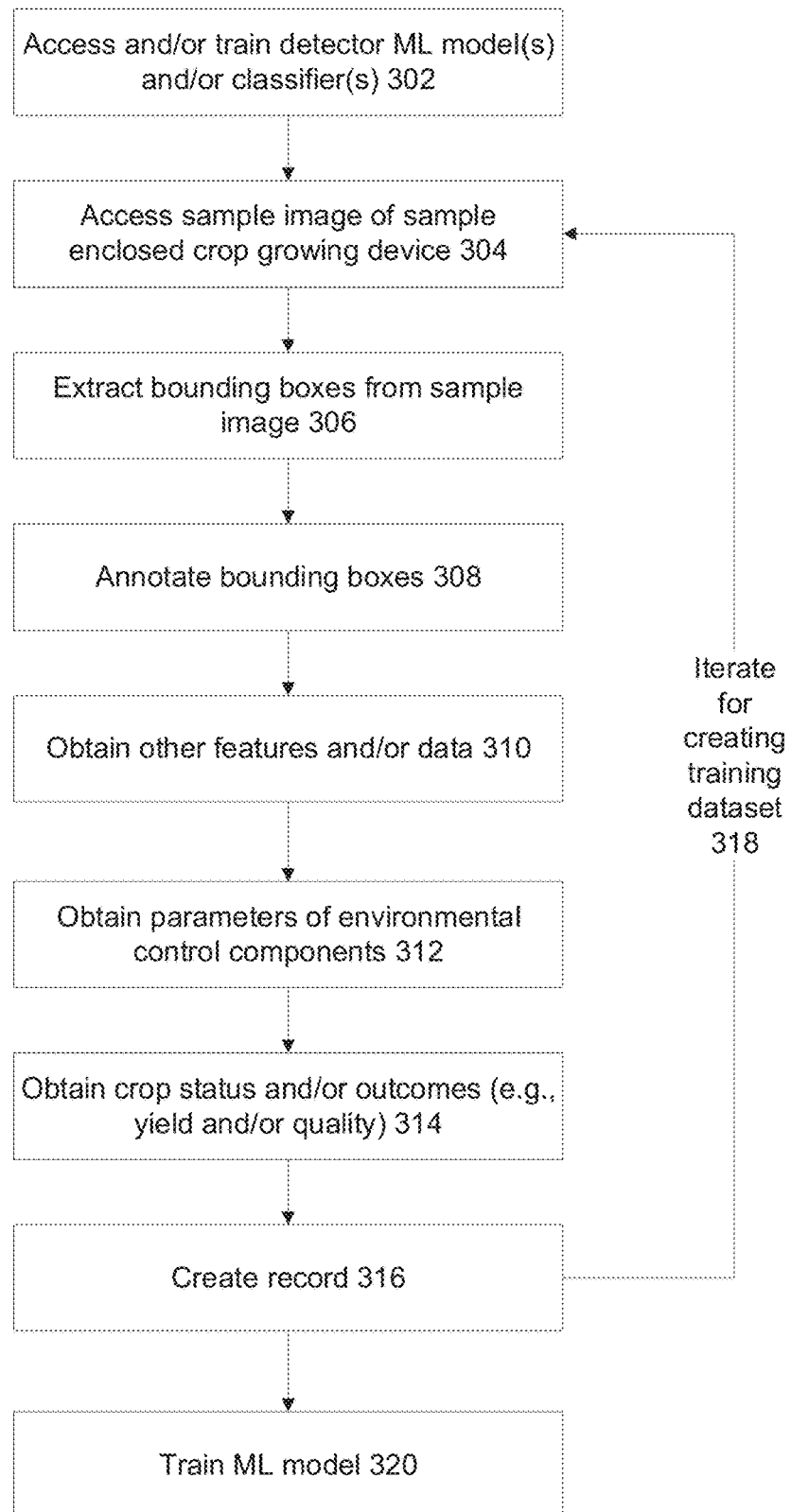
FIG. 3 is a flowchart of a method of training a machine learning model for generating parameters for adjusting environmental control components of an enclosed crop growing device housing different types of crops and/or at different growth stages in response to an image of the crops, in accordance with some embodiments of the present invention.
Figure 4:
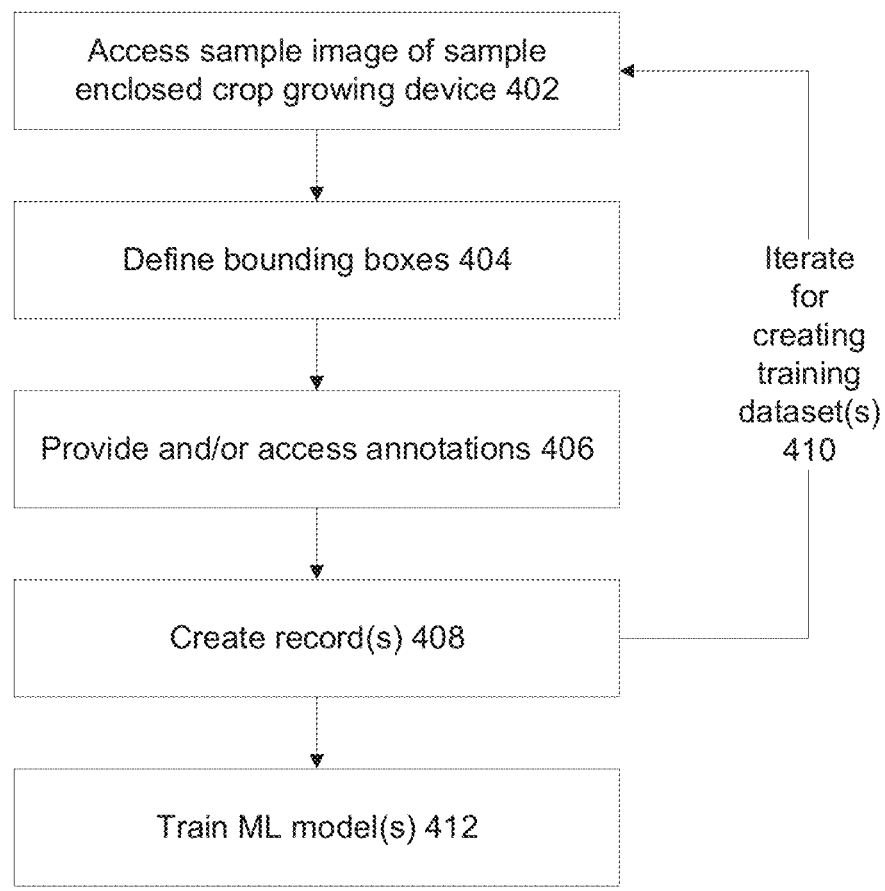
FIG. 4 is a flowchart of a method of training different detector and/or classifiers for annotating bounding boxes extracted from an image of different types of crops and/or at different growth stages, in accordance with some embodiments of the present invention.
Figure 5:
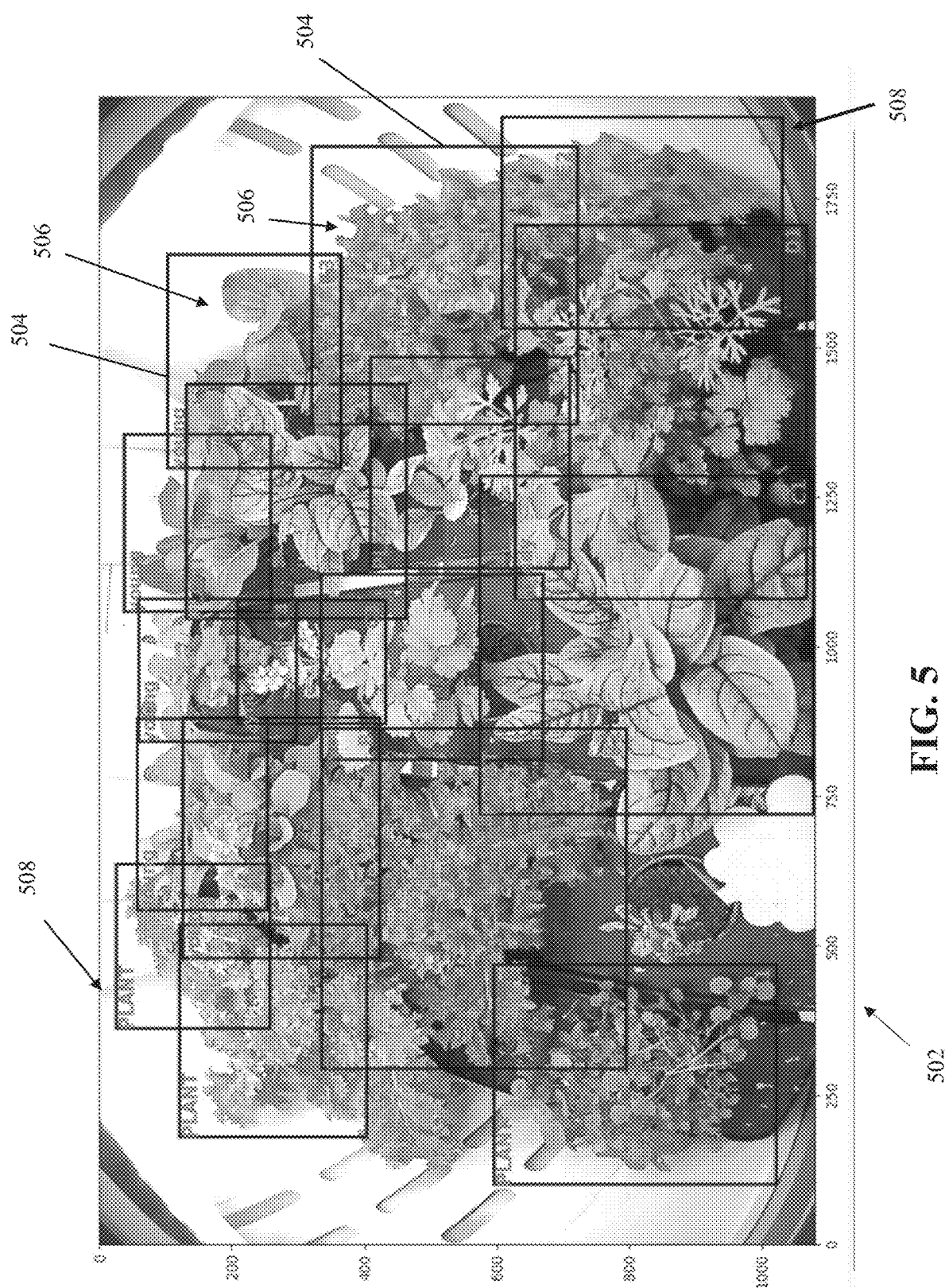
FIG. 5 is an example of an image with bounding boxes each depicting a single crop and one or more annotations, in accordance with some embodiments of the present invention.
Figure 6:
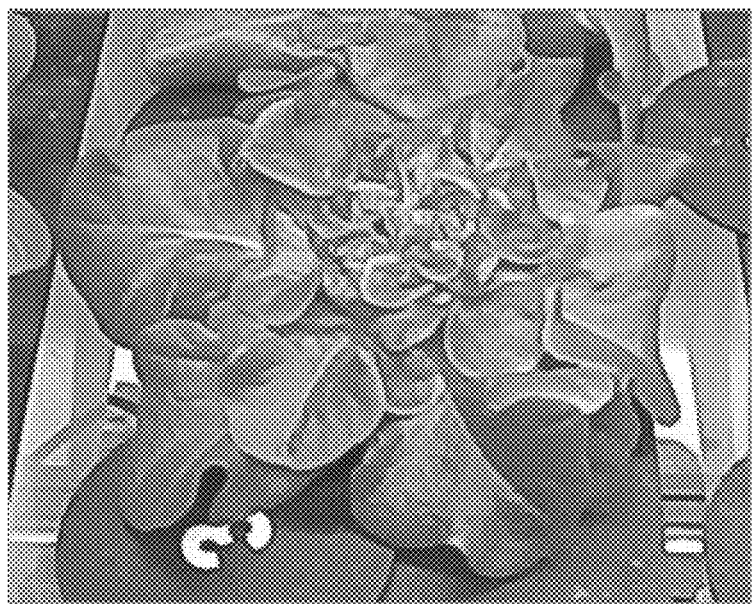
FIG. 6 is an example of images extracted from bounding boxes generated for an input image depicting crops within an enclosed crop growing device, in accordance with some embodiments of the present invention.
Figure 6:
Figure 7:
FIG. 7 is another example of images extracted from bounding boxes generated for an input image depicting crops within an enclosed crop growing device, in accordance with some embodiments of the present invention.
Figure 7:
Figure 8:
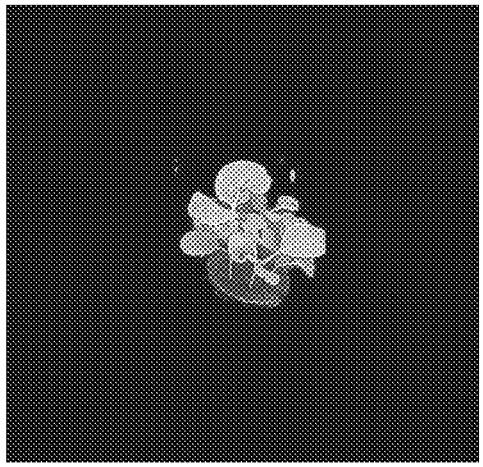
FIG. 8 is another example of images extracted from bounding boxes generated for an input image depicting crops within an enclosed crop growing device, in accordance with some embodiments of the present invention.
Figure 8:
Figure 8:
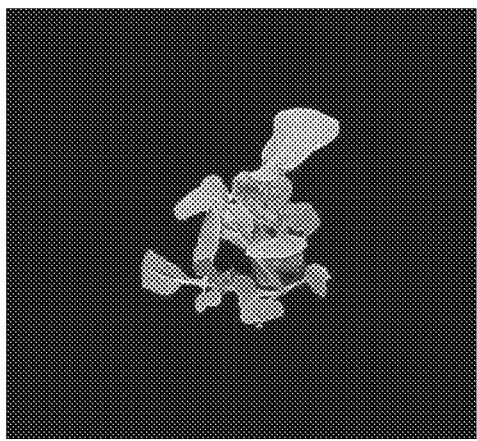
Figure 8:
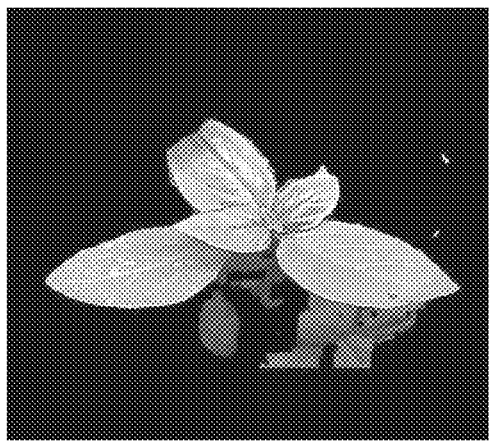

Reference is also made to FIG. 1, which is a block diagram of components of a system 100 including a computing device 110 (sometimes referred to herein as controller) for running a ML model 106 for controlling parameter(s) of environmental control components 114 of an enclosed crop growing device 104 housing crops 102A of multiple different types and/or at different growth stages in multiple predefined crop growing locations 102B, in accordance with some embodiments of the present invention. Reference is also made to FIG. 2, which is a flowchart of a method of automatically controlling an enclosed crop growing device housing different types of crops and/or at different growth stages, in accordance with some embodiments of the present invention. Reference is also made to FIG. 3, which is a flowchart of a method of training a machine learning model for generating parameters for adjusting environmental control components of an enclosed crop growing device housing different types of crops and/or at different growth stages in response to an image of the crops, in accordance with some embodiments of the present invention. Reference is also made to FIG. 4, which is a flowchart of a method of training different detector and/or classifiers for annotating bounding boxes extracted from an image of different types of crops and/or at different growth stages, in accordance with some embodiments of the present invention. Reference is also made to FIG. 5, which is an example of an image 502 with bounding boxes 504 each depicting a single crop 506 and one or more annotations 508, in accordance with some embodiments of the present invention. Reference is also made to FIG. 6, which is an example of images 602 and 604 extracted from bounding boxes generated for an input image depicting crops within an enclosed crop growing device, in accordance with some embodiments of the present invention. Reference is also made to FIG. 7, which is another example of images 702 and 704 extracted from bounding boxes generated for an input image depicting crops within an enclosed crop growing device, in accordance with some embodiments of the present invention. Reference is also made to FIG. 8, which is another example of images 802, 804, 806, and 808 extracted from bounding boxes generated for an input image depicting crops within an enclosed crop growing device, in accordance with some embodiments of the present invention.

System 100 may implement one or more features described herein with respect to FIGS. 2-8, optionally by one or more processors(s) 108 executing code stored on a memory 112.

System 100 includes enclosed crop growing device 104, for example, a chamber with access door. The chamber may include one or more shelves. The chamber may be sealed with respect to an external environment, such that all entries and exits (e.g., air, water, and insects) may be controlled by environmental control components 114 and/or monitored by sensors (e.g., image sensor 116A, and/or other sensors 116).

Enclosed crop growing device 104 includes multiple predefined crop growing locations 102B, for example, apertures and/or containers. The predefined crop growing locations 102B may be implemented, for example, within a removable tray.

Multiple crops 102B of different types and/or at different stages of growth are located within predefined crop growing locations 102B. Examples of crop types and/or growth stages are described herein.

A computing device 110 is in communication with an image sensor(s) 116A capturing images of predefined crop growing locations 102B with crops 102A therein, within enclosed crop growing device 104. Image sensor(s) 116A may be implemented as, for example, a still digital camera, a digital video camera, CMOS sensor, and the like. Image sensor(s) 116A may capture images at the visible wavelength spectrum, and/or other ranges, for example, thermal, near infrared, far infrared, ultraviolet, and the like. Image sensor(s) 116A may be set to simultaneously capture all predefined crop growing locations 102B, which may include crops 102A and/or one or more of which may remain empty (i.e., without a crop placed therein). For example, image sensor 116A includes a wide angle lens, and/or is set at a selected distance to enable to capture the images.

Computing device 110 may be in communication with one or more other sensor(s) 116B which may monitor environmental conditions within enclosed crop growing device(s) 116B. Examples of sensor(s) 116B include: temperature, humidity, air pressure, oxygen concentration, carbon dioxide concentration, and the like.

Computing device 110 is in communication with one or more environmental control components 114 that control the environment within enclosed crop growing device(s) 116B. Examples of environmental control components 114 include: irrigation delivery system, air delivery system, carbon dioxide concentration controller, oxygen concentration controller, temperature control system, air pressure control system, and illumination control system (e.g., visible light, infrared, and the like).

Computing device 110 may be implemented in different architectures. In an integrated architecture, computing device 110 may be installed and/or embedded within enclosed crop growing device 104. For example, as circuitry, a card within a connector slot, and/or computer installed within a housing of enclosed crop growing device 104 and/or box connected to enclosed crop growing device 104. In a localized architecture, computing device 110 may be located externally to enclosed crop growing device 104, but providing localized services dedicated to enclosed crop growing device 104. For example, computing device 110 may be in communication with environmental control components 114 and/or image sensor(s) 116A and/or other sensor(s) 116B of a specific enclosed crop growing device 104 via a short range network 122, for example, a short range wireless network (e.g., Bluetooth) and/or via a cable (e.g., USB cable) and/or via an internet of things (IoT) network (where the sensors 116A and/or 116B and/or components 114 are the IoTs). Computing device 110 may be implemented as, for example, a mobile device, a smartphone, a tablet computer, a laptop computer, a desktop computer, a virtual machine, and the like. For example, a user may periodically open an app running on their mobile device for setting parameters of environment control components 114 obtained as an outcome of ML model(s) 106 running on the mobile device, fed input from image sensor(s) 116A and/or other sensor(s) 116B. In another architecture, computing device 110 may provide centralized services to multiple remotely located enclosed crop growing devices 2104. Computing device 110 may be implemented as, for example, a server, a computing cloud, a virtual server, and the like. Computing device 110 may receive data from image sensor(s) 116A and/or other sensor(s) 116B of multiple different enclosed crop growing devices 104 from in different geographical locations. Computing device 110 centrally feeds the data into ML model(s) 106. Respective outcomes of parameters are sent to the corresponding enclosed crop growing devices 104 for local control of respective environmental control component 114.

System 100 may include code instructions 112B for training ML model(s) 106 using training dataset(s) 118A. Training code 112B may be stored on memory 112 and/or a data storage device 118. Alternatively, ML model(s) 106 is trained by another computing device (e.g., server 120) and transmitted to computing device 110 over a network 122 and/or remotely accessed by computing device 110 over network 122 (e.g., via a software interface for example, application programming interface (API), and/or software development kit (SDK)).

In yet another implementation, client terminal(s) 124 may act as a controller for adjusting environment control components 114 of a corresponding enclosed crop growing device 104. The ML model may be executed by computing device 110, and the instructions for adjustment of environment control components 114 are locally generated by respective client terminals 124 (acting as the controller) that access a server implementation of computing device 110 to obtain the parameters as an outcome of the ML model. In this manner, the ML model centrally computes, for each respective client terminal 124, the parameters for respective enclosed crop growing devices 104, and each respective client terminal 124 may locally generate its own set of instructions for its own associated environment control components 114.

Processor(s) 308 may be implemented, for example, as a central processing unit(s) (CPU), a graphics processing unit(s) (GPU), field programmable gate array(s) (FPGA), digital signal processor(s) (DSP), and/or application specific integrated circuit(s) (ASIC). Processor(s) 108 may include one or more processors (homogenous or heterogeneous), which may be arranged for parallel processing, as clusters and/or as one or more multi core processors.

Memory 112 stores code instructions 112A and/or 112B executable by processor(s) 108. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Optionally, computing device 110 includes and/or is in communication with a data storage device 118 for example, for storing ML model(s) 106, and/or for storing training dataset(s) 118A for training ML model(s) 106. Data storage device 118 may be implemented as, for example, a memory, a local hard-drive, a removable storage device, an optical disk, a storage device, and/or as a remote server and/or computing cloud (e.g., accessed using a network connection). It is noted that code stored in data storage device 118 may be loaded into memory 112 for execution by processor(s) 108.

Optionally, computing device 110 is in communication with a user interface 128. User interface 128 may include a mechanism for the user to enter data (e.g., indicate agricultural practices manually performed on the plants, such as when new pods were placed in the enclosed crop growing device) and/or view data (e.g., the current computed parameters), for example, a touch screen, a display, a mouse, a keyboard, and/or a microphone with voice recognition software. User interface 128 may include a graphical user interface (GUI) presented on a display.

Optionally, computing device 110 includes and/or is in communication with one or more network and/or data interfaces 150 for connecting to network 122 and/or to sensors 116A-B and/or to environmental control component(s) 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 110 may access a server 120 and/or computing cloud (e.g., represented as server 120) over network 122, for example, to obtain ML model(s) 106 and/or code 112A and/or code 112B and/or updates.

Network 122 may be implemented as, for example, the internet, a local area network, a virtual network, a wireless network, a cellular network, a local bus, a point to point link (e.g., wired), and/or combinations of the aforementioned.

Computing device 110 may be in communication with one or more client terminals 124 over network 122. For example, users use respective client terminals 124 as user interface 128 to view data and/or enter data associated with respective enclosed crop growing devices 104. In another example, respective client terminals 124 act as local controllers of enclosed crop growing device 104 where computing device 110 provides centralized use of ML model(s) 106 such as implemented within a computing cloud and/or server.

Referring now back to FIG. 2, at 202, one or more models are trained and/or accessed. Models include, for example, detectors for generating bounding boxes each depicting a respective crop, classifiers for generating one or more annotations for an input of an image cropped from a bounding box, and an ML model for generating parameters for operating components of the enclosed crop growing device, as described herein.

Examples of approaches for training the ML models are described herein, for example, with reference to FIG. 3. Examples of approaches for training the detector model and/or classifier(s) are described herein, for example, with reference to FIG. 4.

Examples of exemplary architectures include models designed to accept an image and/or other data as input, and output bounding boxes and/or classification categories (i.e., annotations) and/or parameters for operating components of the enclosed crop growing device. Examples of architectures include: detectors, classifiers, binary classifiers, multi-class classifiers, a pipeline combination of detector(s) and/or classifier(s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

At 204, an image depicting crops within the enclosed crop growing device is accessed. The image is captured by an image sensor positioned for simultaneously depicting multiple crops.

The image simultaneously depicts multiple crops of different types and/or at multiple different growth stages, located at predefined crop growing locations within the enclosed crop growing device.

The predefined crop growing locations may be fixed, for example, depressions within a tray which may be sized and/or shaped to accept a pre-manufactured pod of earth housing a seed(s) and/or seedling. Alternatively or additionally, the predefined crop growing locations may be variable, for example, containers (e.g., pots) which may be moved around within the enclosed crop growing device.

The image may depict one or more predefined crop growing locations that are empty.

At 206, one or more bounding boxes may be generated for the image.

Optionally, the bounding boxes are generated on the image itself, for example, as an overlay, and/or adjustment of pixel intensity values of the images (e.g., marking the bounding box on the image). Alternatively or additionally, the bounding boxes (e.g., each bounding box) may be extracted from the image, such as by cropping the image to the size of the bounding box, for generating a set of extracted images representing by the bounding boxes.

It is noted that bounding boxes are exemplary and not necessarily limiting, as other borders may be used. For example, other shapes such as circles and/or ovals, and/or non-linear boundaries such as a trace of an outline of the crop.

Each bounding box may depict a single crop therein, and/or may depict an empty crop growing location. In the case of multiple bounding boxes being generated, a single bounding box may be selected per crop, for example, according to highest probability value, randomly, minimum overlap with neighboring bounding boxes of other crops, and the like.

The bounding boxes may be generated by a detector model in response to being fed the image. An example of an approach for training the detector model is found, for example, as described with reference to FIG. 4.

At 208, one or more bounding boxes, optionally each bounding box, may be annotated with one or more annotations.

Optionally, each annotation is associated with a confidence score. The confidence scores may be used to select and/or ignore certain annotations, for example, select annotation with highest score (where multiple annotations are generated as possible outcomes), and/or ignore annotations with scores below a threshold (e.g., indicating lack of confidence), and/or include annotations with scores above the threshold (e.g., indicating significant confidence).

The annotations may be assigned, for example, as text written on the image within the bounding box itself (e.g., changing values of pixels to write the annotation). In another example, the annotations may be represented as metadata tags associated with each bounding box. For example, a set of metadata tags each mapped to a respective bounding box, for example, via an indication of pixel coordinates within the image corresponding to the respective bounding box.

The annotating may be automatically performed by feeding each bounding box (e.g., extracted from the image such as by cropping) into one or more classifiers that generate the annotation as an outcome. Alternatively or additionally, other processing is performed, for example, each cropped image defined by a bounding box is filtered for elimination of background, for retaining the leaves of the crop. The filtering may be performed for elimination of extraneous noise and/or for focusing the classifier on the crop itself for reducing classification errors. An example of an approach for training the classifier(s) is found, for example, as described with reference to FIG. 4.

Alternatively or additionally, a pipeline of classifiers is generated, where annotations and/or other outcomes of preceding classifiers are fed into a subsequent classifier in the pipeline. For example, a first annotation by a first classifier is fed into a second classifier in combination with the extracted bounding box to obtain a second annotation. In another example, the first and/or second annotations in combination with the extracted bounding box is fed into a third classifier to obtain a third annotation.

The annotations may be provided, for example, as a binary value (e.g., present or not) optionally generated by a binary classifier, as a classification category selected from multiple candidate categories such as by a multi-class classifier, a discrete and/or continuous value (e.g., on a scale of 1-10 such as indicating degree of severity), and the like.

Optionally, annotations include the type of crop, for example, herb, leafy green, vegetables, fruits, root vegetables, and mushrooms. Alternatively or additionally, the annotation may include more specific types of crops, for example, parsley, dill, lettuce, spinach, cherry tomatoes, small peppers, strawberries, dwarf lemons, baby carrots, dwarf beets, and oyster mushrooms.

Alternatively or additionally, annotations include the growth stage of the crop, for example, seed stage (no visible sprout), seedling, new old, old pod, young plant, plant, and the like.

Optionally, where bounding boxes are generated for crop growing locations, the annotation may indicate whether a crop is present at the crop growing location denoted by the bounding box or whether the crop growing location is empty.

Examples of growth stages of the crop include: pod stage prior to emergence of leaves, new plant, end of life plant requiring replacement, plant ready to harvest, plant not yet ready to harvest.

Alternatively or additionally, the annotation includes an indication of whether insects are present in the bounding box or not. In another example, the annotation may include additional details of insects, for example, type of insect(s), estimated number of insects, location of insects on the crop (e.g., leaves, stalk, fruits), and the like.

Alternatively or additionally, the annotation includes an indication of health of each crop depicted in each bounding box, the health of the crop including an indication of nutrition and/or disease.

Alternatively or additionally, the annotation includes an indication of whether the crop depicted in the bounding box is ready for harvesting (e.g., ready to eat) or not.

At 210, other features are computed and/or extracted from the images. Alternatively or additionally, other data is obtained. Alternatively or additionally, features may be extracted from the other data.

Optionally, the other feature(s) include an indication of a geographical arrangement of the predefined crop growing locations (and/or crops therein), and/or distances between the crop growing locations (and/or crops therein). The geographical arrangement may be represented for example, as a grid and/or graph indicating relative locations of the crops and/or distances between the crops. The grid and/or graph may be computed based on the relative locations of bounding boxes on the image and/or distances between centers of the bounding boxes on the image. The grid and/or graph may be separate from the image, for example, metadata. Alternatively or additionally, the grid and/or graph may be represented on the image, for example, drawn on the image such as by drawing edges between centers of bounding boxes and labelling each edge with an indication of distance. Empty predefined crop growing locations may be represented such as with a null value and/or other annotation, or ignored.

Alternatively or additionally, other feature(s) include an indication of historical agricultural actions performed by a user on the crops, for example, harvesting events of one or more crops, average harvesting period, harvesting count, predicted harvesting windows, when crop was added to the enclosed crop growing device, user moving around location of the crops, user harvesting a crop or portion thereof and leaving the rest growing (e.g., cutting off some parsley leaves while leaving the rest growing), user watering the crops, user adding feeding to the crops, user adjusting one or more of the components (e.g., light intensity, temperature, etc.,). The agricultural actions may be obtained, for example, by analysis of the images, such as analyzing a sequence of images for detecting a crop that was previously present and is no longer present, by a user using an application on a client terminal to indicate the harvesting action, and by analyzing sensor data (e.g., sensor detecting when a door of the enclosed crop growing device was opened). Each agricultural action may be labelled with a timestamp (including date) indicating time and/or date when the agricultural action took place.

Alternatively or additionally, other feature(s) include data obtained from sensors monitoring the enclosed crop growing device. For example, pH (e.g., of soil), temperature (e.g., air, water), humidity, height of water (e.g., per pod) oxygen concentration, carbon dioxide concentration, and electrical conductivity (EC) of medium in which the crops are growing. Features may be computed from the data obtained from the sensors, for example, sequential values, mean, standard deviation, pattern over time (e.g., over 24 hours), and the like. In an example where there are multiple sensors distributed within the enclosed crop growing device, the features may include an indication of value per sensor and/or indication of geographical location of the sensors optionally relative to the crops, for example, by labelling the image with values for each sensor corresponding to the location of the sensor, graph and/or grid indicating value of each sensor as nodes and distances between sensors as edges.

Alternatively or additionally, other feature(s) include current values of the parameters of the components of the enclosed crop growing devices and/or historical values of the parameters. Features may be computed from the current and/or historical parameters, for example, sequential values, mean, standard deviation, pattern per defined time interval (e.g., over 24 hours), and the like.

At 212, the image and/or bounding boxes and/or features and/or other data may be fed into the ML model, optionally as a combination (e.g., simultaneously).

For example, the image with bounding boxes drawn thereon corresponding to the different crops, where each bounding box is annotated with one or more annotations, is fed into the ML model. In another example, the image with bounding boxes with metadata indicating the annotations, is fed into the ML model. In yet another example, a graph indicating the geographical representation of the crops, where each node in the graph is labelled with its respective annotation, is fed into the ML model, in combination with the image or without the image. The features and/or other data (e.g., historical values, sensor data, and historical agricultural actions) may be fed into the ML model in combination with the image and/or bounding boxes and/or annotations.

At 214, parameters for setting environmental control components that control an environment of the enclosed crop growing device are obtained as an outcome of the ML model.

Examples of parameters include: illumination pattern for generation by an artificial light source (e.g., intensity, wavelength spectrum, and change over time), temperature pattern by an air conditioner component, humidity pattern, and irrigation pattern by an irrigation component.

The parameters generated by the ML model may be based on a prediction for obtaining an optimal crop output for a combination of the crops of different types and/or at different growth stages, for example, maximize yield, maximize quality, maximize health of crops, reduce likelihood of disease, and the like.

Optionally, the parameters are for setting each one of the environmental control components at customized value. The environmental control components may be distributed and/or located at different locations within the enclosed crop growing device according to a distribution pattern, for example, there may be different irrigation elements at different locations for irrigating different regions of the enclosed crop growing device, and/or different air holes for air to enter and/or exit where temperature and/or humidity may be locally set. The parameters may define values according to the distribution pattern.

Optionally, the parameters are according to a prediction of a pattern of future harvesting for one or more crops. For example, based on historical user harvesting of a lettuce and parsley every Friday morning, the ML model may predict the future harvesting pattern will continue, where a lettuce and parsley are harvested every Friday morning. The pattern may define the stages of growth of multiple crops simultaneously located in the enclosed crop growing device, such that every Friday one lettuce and one parsley are ready for harvesting, somewhat like a continuously supply production line. The parameters may be for setting the environmental control components according to the predicted pattern, for example, that every Friday morning one lettuce and one parsley are ready for harvesting. The parameters may be for increasing or slowing a rate of growth of the crop(s) to be ready for harvesting according to the predicted pattern. The parameters may take into account the multiple different crop at different stages of growth to obtain the weekly supply of lettuce and parsley.

Alternatively or additionally, the ML model generates the recommendation for a time pattern of placement of one or more new crops in the enclosed crop growing device to be able to harvest the crops according to the predicted harvesting pattern. For example, on the Tuesday following the Friday harvest of the lettuce and parsley, a new pods with seedlings of lettuce and parsley is to be placed in the enclosed crop growing device. The recommendation may be for presentation on a display of a client terminal, for example, on a touch screen of a mobile device running an application. The recommendation may be generated by the ML model that generates the parameters, optionally the ML generates a combination of the parameters and the recommendation. Alternatively, the recommendation may be generated by another ML model that may be trained on records of harvesting patterns of crops.

At 216, the environmental control components may be automatically adjusted (e.g., by a controller) according to the parameters obtained from the ML model.

At 218, one or more features described herein with reference to 204-216 of FIG. 2 may be iterated. Iterations may be performed, for example, per defined time interval (e.g., once per 12 hours, daily, once per 2 days, once per 3 days), and/or in response to an event (e.g., harvesting of crop, adding new crop, changing locations of crops).

Optionally, the iterations are for iteratively identifying one (or more) of the weakest crops. At 208, the image may be analyzed to identify one (or more) crops as a weakest of the crops currently growing in the enclosed crop growing device. The analysis may be done by feeding the crops within bounding boxes into a classifier that classifies the crop within, for example, as weak, strong, average, and the like. The classifier may analyze single bounding boxes (to classify the crop), or a set of bounding boxes to find the weakest of the set. The classifier may be trained on a training dataset of bounding boxes of crops labelled with a ground truth indicating weakness. At 212, the indication of the weakest crop may be fed into the ML model in combination with the image and/or other data. At 216, the parameters obtained from the ML model are for setting the environmental control parameters for improving growth of the weakest of the crops. The analysis of the image to identify a new crop as the weakest, and the feeding into the ML model for obtaining a new set of parameters for improving growth of the new at least one weakest crop, may be iterated over multiple time intervals, where each time a different crop may be identified as weakest.

Optionally, alerts may be generated in response to certain outcomes. For example, an alert may be generated in response to an indication of "ready for harvesting" by a classifier fed an input of a cropped bounding box of a certain crop. The alert may be generated, for example, a message sent to a mobile phone of a user, an email sent to an address of a user, and/or a message (e.g., text, image, video) presented on a user interface (e.g., display) associated with the enclosed crop growing device.

Optionally, false positive and/or false negative recommendations generated by the models described herein may be tracked. Respective models may be retrained when the generated recommendations fall meet a requirement indicating reduced performance.

Referring now back to FIG. 3, at 302, one or more detector models and/or classifiers are trained and/or accessed. Examples of approaches for training the detector model and/or classifier(s) are described herein, for example, with reference to FIG. 4.

At 304, a sample image of a sample enclosed crop growing device is accessed.

The sample image simultaneously depicts multiple crops of multiple different types at multiple different growth stages arranged at multiple predefined crop growing locations of the sample enclosed crop growing device.

Additional exemplary details of the sample image are described, for example, with respect to the image described with reference to 204 of FIG. 2.

At 306, multiple bounding boxes are obtained for the sample image. The bounding boxes may be generated by the detector model in response to an input of the sample image. Alternatively or additionally, the bounding boxes may be manually marked on the sample image, for example, via a user interface presenting the sample image and including a mechanism to enable a user to mark the bounding boxes thereon.

The bounding boxes may be created according to crop growing locations, including crop growing locations that are empty and crop growing locations that include a crop. Alternatively or additionally, the bounding boxes may be created according to crops, where no bounding box is indicated for empty crop growing locations.

Additional exemplary details of obtaining bounding boxes for the sample image are described, for example, with reference to 204 of FIG. 2.

At 308, one or more annotations are obtained and/or generated for the sample image.

Optionally, each bounding box representing a respective crop is associated with one or more annotations.

The annotations may be obtained by feeding each bounding box (e.g., cropped from the sample image) into one or more classifiers and/or into a classifier pipeline. Cropped images may be filtered for removal of background, for retaining the crop itself. Alternatively or additionally, the annotations may be manually provided, for example, via a user interface presenting the bounding box and/or sample image and including a mechanism to enable a user to enter the annotation.

Additional exemplary details of annotations are described, for example, with reference to 208 of FIG. 2

At 310, features may be obtained, computed and/or extracted. Other data may be obtained. Additional exemplary details of features and/or other data are described, for example, with reference to 210 of FIG. 2.

At 312, historical and/or current parameters for setting the environmental control components, are obtained. The parameters are for setting the components that control an environment of the sample enclosed crop growing device where the crops depicted in the sample image are growing.

Additional exemplary details of the parameters are described, for example, with reference to 214 of FIG. 2. It is noted that in 214 of FIG. 2, the parameters are an outcome of the ML model, whereas here with respect to 312 of FIG. 2, the parameters are used for training the ML model.

At 314, an indication of crop status is obtained. The crop status may be the status of the crop at the time at which the sample image is captured. The crop status may include, for example, yield, quality, and/or plant health.

At 316, a record may be created for the sample image. The record may include the sample image, and/or bounding boxes, and/or annotations, and/or other data and/or other features. The record corresponds to the data that is to be fed into the ML model, for example, as described with reference to 212 of FIG. 2. For example, the record may include the sample image, marked with bounding boxes each indicating a respective crop, labelled with respective annotation(s) per bounding box.

The record may include the indication of crop status. The crop status may represent a target for guiding the ML model for generating an outcome of the parameters predicted to maximize and/or optimize crop status.

The record may include a ground truth of the parameters of the components of the enclosed crop growing device.

At 318, one or more features described herein with reference to 304-316 may be iterated for creating one or more training datasets. Each iteration may create a record for a respective sample image. Multiple records for multiple sample images may be created. The sample images may be obtained at time intervals for a certain enclosed crop growing device, for example, once per day over 3 months (or other time interval sufficient for capturing a variety of crops from seed or seedling until harvesting). The sample images may be for multiple different enclosed crop growing devices, such as at different geographical locations and/or being used by different users.

At 320, the ML model is trained on the training dataset(s). The ML model may be trained for selecting the parameters for optimizing and/or maximizing the crop status, such as yield and/or quality and/or health of crops. The outcome of the ML model is described, for example, with respect to 214 of FIG. 2.

Referring now back to FIG. 4, at 402, a sample image of a sample enclosed crop growing device is accessed.

Users of enclosed crop growing devices may participate in the training by tagging pod crops using a mobile application running on their mobile device. User input may help create a diverse training dataset.

The sample image simultaneously depicts multiple crops of multiple different types at multiple different growth stages arranged at multiple predefined crop growing locations of the sample enclosed crop growing device.

Additional exemplary details of the sample image are described, for example, with respect to the image described with reference to 204 of FIG. 2.

At 404, multiple bounding boxes may be obtained for the sample image. The bounding boxes may be manually marked on the sample image, for example, via a user interface presenting the sample image and including a mechanism to enable a user to mark the bounding boxes thereon. Alternatively or additionally, when the detector model has already been trained, the bounding boxes may be generated by the detector model in response to an input of the sample image.

Each bounding box may be cropped to extract the portion of the image defined by the bounding box. The use of an Object Detector may aid for precisely cropping the specific crop from the sample images.

Alternatively or additionally, other processing is performed, for example, each cropped image defined by a bounding box is filtered for elimination of background, for retaining the leaves of the crop.

Additional exemplary details of obtaining bounding boxes for the sample image are described, for example, with reference to 204 of FIG. 2.

At 406, one or more annotations are obtained for the sample image.

Optionally, each bounding box representing a respective crop is associated with one or more annotations.

The annotations may be manually provided, for example, via a user interface presenting the bounding box and/or sample image and including a mechanism to enable a user to enter the annotation. For example, users may use the mobile application running on their mobile devices to electronically and/or visually tag the different crops with the respective annotation(s).

Additional exemplary details of annotations are described, for example, with reference to 208 of FIG. 2.

At 408, a record may be created for the sample image and/or for the bounding box.

The record may include the sample image, and/or cropped portion defined by the bounding boxes, and/or annotations.

The record may be created for training a detector model, or for training a classifier.

For training the detector model, the record may include the sample image and a ground truth of the bounding boxes (optionally overlaid over the sample image).

For training the classifier model, the record may include one or more of the bounding box. Optionally a portion of the sample image depicted within the bounding box, which may be extracted from the sample image as defined by the bounding box, is included in the record. The record may further include a ground truth including one or more annotations assigned to the bounding box.

At 410, one or more features described herein with reference to 402-408 may be iterated for creating one or more training datasets.

A training datasets for training the detector model may be created using records of sample images and bounding boxes as ground truth.

One or more training datasets for training one or more classifiers may be created using records of sample bounding boxes and annotation(s) as ground truth. There may be multiple training datasets for training multiple classifiers, where each training dataset is for a certain type of annotation. Alternatively, a multi-class classifier is trained that generates multiple types of annotations for an input of a bounding box.

At 412, the detector model and/or one or more classifier may be trained on their respective training datasets.

Examples of exemplary not necessarily limiting training datasets for training one or more different types of classifiers and/or detector models are now described.

The detector model may be trained on a training dataset of records. A record includes a sample image, and a ground truth bounding boxes. Each bounding box demarcates a single crop or a single empty crop growing location. The detector model may be implemented as, for example, based on the "You Only Look Once" (YOLO) family of object detection models.

A classifier, optionally a multi-class classifier, may be trained on a training dataset of records. A record includes a sample cropped bounding box depicting a single crop extracted from a sample image, and a ground truth indicating a type of the crop. The multi-class classifier may generate the type of crop, where there are multiple possible types of crops that can be expected in an input bounding box.

Alternatively or additionally, the classifier may be trained on a training dataset of records. A record includes a sample bounding box depicting a single crop extracted from a sample image, and a ground truth indicating whether one or more insects are present on the crop or not and/or other indications of insects, for example, as described herein.

Alternatively or additionally, the classifier may be trained on a training dataset of records where a record includes a sample bounding box depicting a single crop extracted from a sample image, and a ground truth indicating health of the crop, for example, as described herein.

Alternatively or additionally, the classifier, optionally a binary classifier, may be trained on a training dataset of records. A record includes a sample bounding box depicting a single crop extracted from a sample image, and a ground truth indicating whether the single crop is ready for harvesting or not.

Referring now back to FIG. 5, image 502 simultaneously depicts multiple different crops 506 (two crops marked for clarity) at different growth stages. Bounding boxes 504 (two bounding boxes marked for clarity) may be marked on image 502, optionally by a detector model that is fed image 502, as described herein. Each bounding box 504 may be annotated with one or more annotations 508 (two annotations marked for clarity), for example, growth stage and/or type of plant. The annotations 508 may be obtained by cropping and/or extracting the portion of the image depicting within each bounding box 504, and feeding into one or more classifiers and/or into a classifier pipeline, as described herein. The annotations 508 may be indicated on the image itself, and/or as metadata associated with each bounding box 504. For example, the following annotations 508 are shown in image 502: "young" denoting a young plant, "ready" indicating that the crop is ready for harvesting "Plant" indicating an identified crop, and letters and numbers such as "A1", "E3", etc., Which may indicate the type of plant.

Image 502 with bounding boxes 504 and annotations 508 may represent an example of input into the ML model descried herein, which generates an outcome of parameters for setting components for controlling the environment of the enclosed crop growing device, as described herein.

Referring now back to FIG. 6, images 602 and 604 are extracted from bounding boxes generated for an input image depicting crops within an enclosed crop growing device. Each of images 602 and 604 may be fed into a classifier, optionally a multi-class classifier, for obtaining an outcome indicating the type of crop depicted in each respective image. An annotation indicating the type of crop in each respective image may be generated.

Referring now back to FIG. 6, images 702 and 704 are extracted from bounding boxes generated for an input image depicting crops within an enclosed crop growing device. Each of images 602 and 604 may be fed into a classifier, optionally a multi-class classifier, for obtaining an outcome indicating the type of crop depicted in each respective image. An annotation indicating the type of crop in each respective image may be generated.

Referring now back to FIG. 7, images 702 and 704 are extracted from bounding boxes generated for an input image depicting crops within an enclosed crop growing device. Each of images 702 and 704 may be fed into a classifier, for obtaining an outcome indicating whether the crop is ready for harvesting or not. An annotation indicating whether the crop is ready for harvesting or not may be generated for each image.

Referring now back to FIG. 8, images 802, 804, 806, and 808 are extracted from bounding boxes generated for an input image depicting crops within an enclosed crop growing device. Images 802, 804, 806, and 808 have undergone filing for removal of background details/noise, retaining the crop itself. Background is shown as black, but may be flagged for non-processing by models. Each of images 802, 805, 806, and 808 may be fed into a classifier, for obtaining an outcome indicating whether there are insects on the crop or not. An annotation indicating whether there are insects on the crop or not may be generated for each image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically controlling an enclosed crop growing device, comprising:
    monitoring historical harvesting events by a user of at least one crop growing in the enclosed crop growing device;
    feeding an image of the enclosed crop growing device into a machine learning (ML) model in combination with an indication of a pattern of the historical harvesting events of the at least one crop by the user,
    wherein the pattern of historical harvesting events includes a type of the at least one crop that was harvested, a number of the at least one crop that was harvested, and at least one timestamp indicating date of harvest,
    wherein the image simultaneously depicts a plurality of crops of a plurality of different types at a plurality of different growth stages arranged at a plurality of predefined crop growing locations within the enclosed crop growing device;
    obtaining as an outcome of the ML model, a prediction of future harvest date of the at least one crop by the user, and a plurality of parameters for setting a plurality of environmental control components that control an environment of the enclosed crop growing device for slowing down or increasing a rate of growth of the at least one crop to be ready for harvest at the predicted future harvest date, and a recommended time pattern for placement of at least one new crop in the enclosed crop growing device for maintaining a continuous step-wise supply for future harvesting; and automatically adjusting the plurality of environmental control components according to the plurality of parameters, wherein the plurality of environment control components include feeding and/or irrigation delivery system.

2. The computer implemented method of claim 1, further comprising training the machine learning model by:

creating a training dataset of a plurality of records, wherein a record includes:

a sample image of a sample enclosed crop growing device, wherein the sample image simultaneously depicts a plurality of crops of a plurality of different types at a plurality of different growth stages arranged at a plurality of predefined crop growing locations of the sample enclosed crop growing device;

a plurality of annotations of the sample image, each crop associated with at least one annotation including at least one of: type of crop, growth stage, and for each crop location an indication of whether a crop is present in the crop growing location or whether the crop growing location is empty; and a ground truth of a plurality of parameters for setting a plurality of environmental control components that control an environment of the sample enclosed crop growing device where the plurality of crops depicted in the sample image are growing; and training the machine learning model on the training dataset.

3. The computer implemented method of claim 2, wherein a record further includes an indication of crop status including yield and/or quality, and wherein the ML model is trained for selecting the parameters for optimizing and/or maximizing the yield and/or quality of the plurality of crops.

4. The computer implemented method of claim 1, further comprising extracting a plurality of features of the image, and feeding the plurality of features into the ML model.

5. The computer implemented method of claim 4, wherein extracting the plurality of features comprises generating a bounding box corresponding to each predefined crop growing location and/or each crop of the plurality of crops, and annotating each bounding box with at least one annotation, wherein feeding comprises feeding the image with a plurality of bounding boxes corresponding to the plurality of different crops, each bounding box associated with at least one annotation.

6. The computer implemented method of claim 5, wherein the annotation of each box includes at least one of: the type of crop, growth stage of the crop, and whether a crop is present at the crop growing location denoted by the bounding box or whether the crop growing location is empty.

7. The computer implemented method of claim 6, wherein the growth stage is selected from: pod stage prior to emergence of leaves, new plant, end of life plant requiring replacement, plant ready to harvest, plant not yet ready to harvest.

8. The computer implemented method of claim 5, wherein the annotating is automatically performed by: feeding the image into a detector model that generates a plurality of bounding boxes, cropping each bounding box, and feeding each bounding box into a classifier that generates at least one annotation as an outcome thereof.

9. The computer implemented method of claim 8, wherein the detector model is trained on a training dataset of a plurality of records, each record including a sample image of a sample enclosed crop growing device depicting a plurality of crops of a plurality of different types at a plurality of different growth stages arranged at a plurality of predefined crop growing locations of the sample enclosed crop growing device, and a ground truth of a plurality of bounding boxes, each bounding box demarcating a single crop or a single empty crop growing location.

10. The computer implemented method of claim 9, wherein for each bounding box the ground truth further includes a growth stage, and/or whether the bounding box denotes the single crop or the single empty cropping location.

11. The computer implemented method of claim 8, wherein the classifier comprises a multi-class classifier, the multi-class classifier is trained on a training dataset of a plurality of records, wherein a record includes a sample cropped bounding box extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating a type of crop from the plurality of different types.

12. The computer implemented method of claim 8, wherein the annotation comprises an indication of whether insects are present in the bounding box or not.

13. The computer implemented method of claim 12, wherein the classifier is trained on a training dataset of a plurality of records, wherein a record includes a sample bounding box depicting a single crop extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating whether one or more insects are present on the crop or not.

14. The computer implemented method of claim 8, wherein the annotation comprises an indication of health of each crop depicted in each bounding box, the health of the crop including an indication of at least one of nutrition and disease.

15. The computer implemented method of claim 14, wherein the classifier is trained on a training dataset of a plurality of records, wherein a record includes a sample bounding box depicting a single crop extracted from a sample image depicting a plurality of crops of a plurality of different types at a plurality of different growth stages arranged at a plurality of predefined crop growing locations, and a ground truth indicating health of the crop.

16. The computer implemented method of claim 8, wherein the annotation comprises an indication of whether the crop depicted in the bounding box is ready for harvesting or not.

17. The computer implemented method of claim 16, further comprising generating an alert in response to the indication of ready for harvesting.

18. The computer implemented method of claim 16, wherein the classifier comprises a binary classifier trained on a training dataset of a plurality of records, wherein a record includes a sample bounding box depicting a single crop extracted from a sample image of a sample enclosed crop growing device depicting a plurality of crops of a plurality of different types at a plurality of different growth stages arranged at a plurality of predefined crop growing locations of the sample enclosed crop growing device, and a ground truth indicating whether the single crop is ready for harvesting or not.

19. The computer implemented method of claim 4, wherein at least one feature of the plurality of features indicate a geographical arrangement of each predefined crop growing location of the plurality of predefined crop growing locations, and/or distances between the crop growing locations.

20. The computer implemented method of claim 19, wherein the at least one feature includes at least one of a grid and a graph indicating relative locations of the plurality of crops and/or distances between the plurality of crops.

21. The computer implemented method of claim 1, further comprising feeding at least one of current values of the plurality of parameters and historical values of the plurality of parameters into the ML model in combination with the image.

22. The computer implemented method of claim 1, wherein at least one of the predefined crop growing locations depicted in the image is empty.

23. The computer implemented method of claim 1, wherein the plurality of parameters include: illumination pattern for generation by an artificial light source, temperature pattern by an air conditioner component, and irrigation pattern by an irrigation component.

24. The computer implemented method of claim 1, wherein the plurality of parameters generated by the ML model are predicted to obtain an optimal crop output for a combination of the plurality of crops.

25. The computer implemented method of claim 1, further comprising feeding into the ML model in combination with the image, features extracted from one or more sensors monitoring the enclosed crop growing device.

26. The computer implemented method of claim 1, wherein the plurality of parameters are for setting each one of the environmental control components at customized values, wherein the environmental control components are distributed and located at different locations within the enclosed crop growing device according to a distribution pattern, the plurality of parameters are for the distribution pattern.

27. The computer implemented method of claim 1, further comprising analyzing the image to identify at least one crop as a weakest of the plurality of crops, feeding the indication of the weakest at least one crop into the ML model in combination with the image, wherein the parameters are for setting the plurality of environmental control parameters for improving growth of the at least one weakest of the plurality of crops, and iterating the analyzing the image to identify a new at least one crop as the weakest, and the feeding for obtaining a new set of parameters for improving growth of the new at least one weakest crop.

28. A computer implemented method of training a machine learning model for automatically controlling an enclosed crop growing device, comprising:
  creating a training dataset of a plurality of records, wherein a record includes:
    a sample image of a sample enclosed crop growing device,
    an indication of a pattern of historical harvesting events of at least one crop by a user based on monitored historical harvesting events by the user of at least one crop growing in the sampled enclosed crop growing device,
    wherein the pattern of historical harvesting events includes a type of the at least one crop that was harvested, a number of the at least one crop that was harvested, and at least one timestamp indicating date of harvest,
    wherein the sample image simultaneously depicts a plurality of crops of a plurality of different types at a plurality of different growth stages arranged at a plurality of predefined crop growing locations of the sample enclosed crop growing device;
    a plurality of annotations of the sample image, each crop associated with at least one annotation including at least one of: type of crop, growth stage, and for each crop location an indication of whether a crop is present in the crop growing location or whether the crop growing location is empty; and
    a ground truth of a future harvest date of the at least one crop by the user, and a plurality of parameters for setting a plurality of environmental control components that control an environment of the sample enclosed crop growing device where the plurality of crops depicted in the sample image are growing for slowing down or increasing a rate of growth of the at least one crop to be ready for harvest at a predicted future harvest date, and a time pattern for placement of at least one new crop in the enclosed crop growing device for maintaining a continuous step-wise supply for future harvesting, wherein the plurality of environment control components include feeding and/or irrigation delivery system; and
  training a machine learning model on the training dataset.

* * * * *